United States Patent [19]

Buerger

[11] Patent Number: 4,913,979
[45] Date of Patent: Apr. 3, 1990

[54] WHEEL TRIM RING

[75] Inventor: Michael H. Buerger, Hendersonville, Tenn.

[73] Assignee: Del-Met Corporation, Walton, N.Y.

[21] Appl. No.: 332,711

[22] Filed: Apr. 3, 1989

Related U.S. Application Data

[62] Division of Ser. No. 152,403, Feb. 4, 1988, Pat. No. 4,825,524.

[51] Int. Cl.⁴ .................................................. B60B 7/00
[52] U.S. Cl. ..................................... 428/577; 428/586; 301/37 T
[58] Field of Search ............... 428/577, 573, 579, 580, 428/578, 582, 583, 586, 595, 594, 603; 301/37 T, 37 R, 37 TP, 37 PB; 29/159 A; 72/361; 228/144, 170

[56] References Cited

U.S. PATENT DOCUMENTS

| | | | |
|---|---|---|---|
| 1,971,161 | 8/1934 | Lyon | 301/37 R |
| 1,995,392 | 3/1935 | Lyon | 301/37 R |
| 2,368,229 | 1/1945 | Lyon | 301/37 R |
| 2,420,320 | 5/1947 | Lyon | 301/37 R |
| 2,882,852 | 4/1959 | Lyon | 29/159 A |
| 3,006,691 | 10/1961 | Lyon | 301/37 T |
| 3,798,728 | 3/1974 | Beisch | 301/37 T |
| 3,876,257 | 4/1975 | Buerger | 301/37 P |
| 4,068,362 | 1/1978 | Spisak | 29/159 A |
| 4,084,526 | 4/1978 | Spisak | 72/393 |
| 4,242,385 | 12/1980 | Hutcheon et al. | 301/37 R |

*Primary Examiner*—John J. Zimmerman
*Attorney, Agent, or Firm*—Natter & Natter

[57] ABSTRACT

A stainless steel wheel trim ring is constructed of an outer ring and a grip annulus. The outer ring is formed of a sheet metal band which is constructed from a rectangular blank having a pair of wedge shaped strain relief notches in a longitudinal edge adjacent to each end. The blank is welded at the joined ends to form the band. During manufacture, the band is expanded in the order of 25% at the longitudinal edge. A crimped peripheral bead along the longitudinal edge secures the grip annulus to the outer ring.

12 Claims, 2 Drawing Sheets

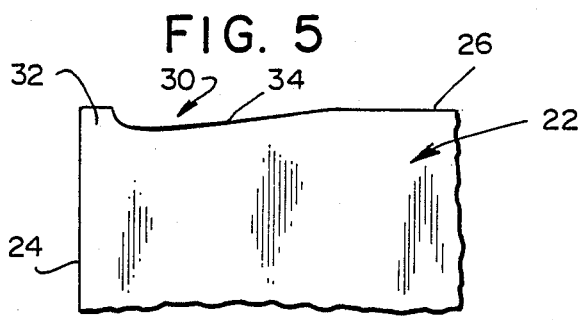
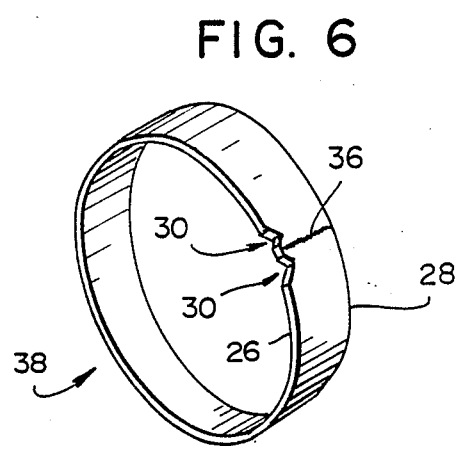
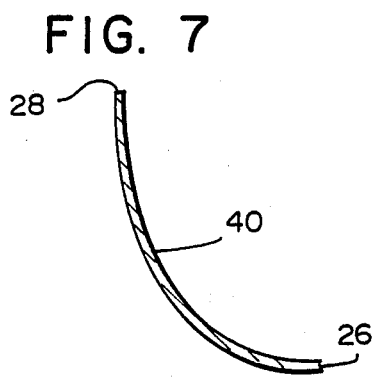
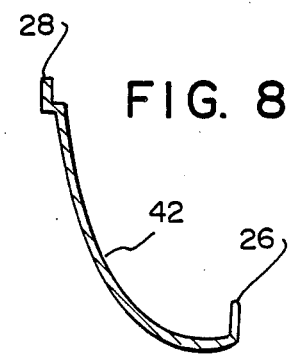
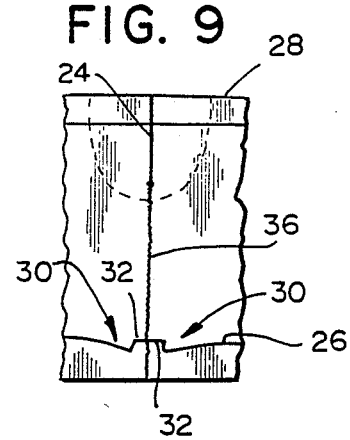
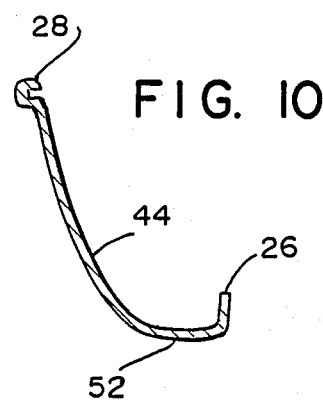
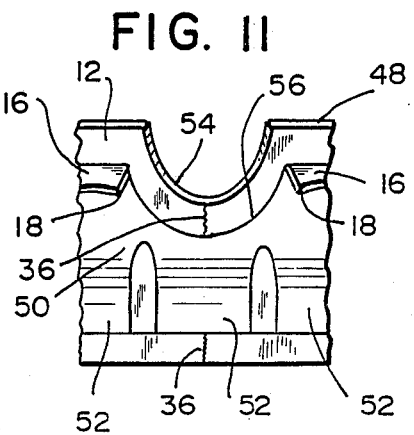
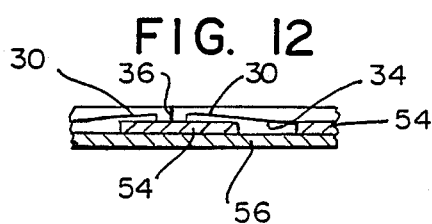

WHEEL TRIM RING

This application is a division of application Ser. No. 152,403, filed Feb. 4, 1988, now U.S. Pat. No. 4,825,524.

BACKGROUND OF THE INVENTION

1. Field Of The Invention

The present invention relates generally to vehicle wheel trim and more particularly to a welded metal trim ring and a blank from which it is formed, with the blank specifically configured to preclude stress failure during manufacture.

2. Description of Background Art

Trim rings have been employed on motor vehicle wheels for many years. Generally, such items comprised a decorative metal contoured outer ring and an inner grip annulus having teeth which engaged the wheel rim. Due to the highly corrosive environment of the typical environment, plated steel and other metals were unacceptable for high quality, OEM type applications; stainless steel has been specified.

Fabrication techniques employed heretofore have included, in the construction of the outer rings, the utilization of elongate rectangular sheet metal blanks which were joined at their ends to form endless cylindrical bands. The bands were thereafter cold formed, utilizing dies. Typical configurations specified up to a 25% enlargement in ring diameter with cold forming. Unfortunately the stresses generated during forming resulted in cracking or tearing of the metal band at the weakest points, which were the ends of the weld.

Although notching of the peripheral edges of the blank adjacent its ends with U-shaped cut outs was attempted the cut outs were generally ineffective with respect to preventing stress cracks and tears upon expansion of the band during subsequent forming.

Examples of dies and forming operations which represent attempts to avoid such stress failure were illustrated in U.S. Pat. No. 4,068,362, issued Jan. 17, 1978, and U.S. Pat. No. 4,084,526, issued Apr. 18, 1978. Both patents disclosed a technique of forming an outer ring from a welded metal cylindrical band by radial expansion at mid-width rather than at a peripheral edge of the band. By such technique, virtually no forming stresses were generated at the ends of the weld and the need for relieving stresses at such weak points was alleviated. Unfortunately, the dies were complicated, costly, and did not provide versatility in the available trim ring contours as compared with conventional forming dies. Further, additional manufacturing steps were required with respect to splitting a band at mid-width.

Another problem encountered in the manufacture of trim rings was that, at the beginning of each weld, the welding apparatus tended to burn through the thickness of the blank, creating weakness in the structure and a surface unsuitable for exposed decorative purposes. Further, although plasma type welding techniques have been utilized in forming stainless steel bands, the metallurgic structure of the blank adjacent the weld was often altered and physical characteristics different from that at the remainder of the band were possible. In some instances, the different physical characteristics were a function of the heat transfer parameters of the metal blank.

In order to reduce the tendency of burn through, copper tabs were proposed to be added to the peripheral edge of the metal blank at a location which was the beginning of the weld stroke. Of course, copper contamination of the blank was a possible risk concomitant with such approach and the proposed procedure resulted in added manufacturing costs in both labor and materials.

SUMMARY OF THE INVENTION

A decorative metal wheel trim ring includes a welded outer ring formed of a particularly configured metal blank. The blank is of generally elongate rectangular shape and is comprised of sheet metal. The opposite ends of the blank are butted together and welded to form an endless cylindrical band. Along one peripheral longitudinal edge of the blank and adjacent each of its ends, a pair of symmetrically disposed wedge shaped strain relief notches are provided. Each notch is configured with its deepest end adjacent the end of the blank and with its bottom surface tapering toward and eventually merging with the longitudinal edge of the blank.

A tab is formed between the deep end of each notch and the respective blank end. The blank ends are butted together and welded to form a cylindrical band with the weld stroke commencing at the tabs. The band is expanded by cold forming into a generally truncated funnel configuration with the notched periphery undergoing maximum deformation. An inner grip annulus is secured to the band by crimping the expanded peripheral edge of the band against radially projecting legs of the annulus. The total peripheral length of each strain relief notch is less than the width of an annulus leg to assure positive engagement of all grip legs.

It has been empirically determined that with a blank formed of 30301 or 30304 stainless steel having a thickness between 0.018 inches to 0.025 inches, a maximum notch depth of 0.030 inches to 0.060 inches and a bottom edge taper in the order of eight (8) degrees provides a band which withstands cold forming distortion in the order of approximately 25% expansion.

From the foregoing summary, it will be appreciated that it is an aspect of the present invention to provide a wheel trim ring of the general character described which is not subject to the disadvantages of the background art aforementioned.

A further aspect of the present invention to provide a wheel trim ring of the general character described which is of high quality yet low in cost and well suited for low cost mass production fabrication.

A consideration of the present invention is to provide a work piece for construction of a wheel trim ring of the general character described which includes strain relief notches particularly adapted to facilitate welding and post welding cold forming operations without stress failure.

A feature of the present invention is to provide a wheel trim ring of the general character described which includes a one piece outer metal ring which has been expanded by cold forming in the order of 25% of its original dimension without stress failure.

Another feature of the present invention is to provide a blank for a wheel trim ring of the general character described which blank includes a pair of wedge shaped strain relief notches in a longitudinal peripheral edge adjacent the ends of the blank with the blank being subject to expansion during cold forming manufacture operations.

Another consideration of the present invention is to provide a welded metal band for use in manufacturing a wheel trim ring of the general character described wherein the band includes a pair of wedge shaped notches adjacent a transverse weld.

A further feature of the present invention is to provide a method of low cost mass production fabrication of stainless steel wheel trim rings of the general character described.

Other aspects, features and considerations of the present invention in part will be obvious and in part will be pointed out hereinafter.

With these ends in view, the invention finds embodiment in various combinations of elements, arrangements of parts and series of steps by which the said aspects, features and considerations are attained all with reference to the accompanying drawings and the scope of which will be more particularly pointed out and indicated in the appended claims.

BRIEF DESCRIPTION OF THE DRAWINGS

In the accompanying drawings, wherein one of the various possible exemplary embodiments of the invention is shown.

FIG. 5 is a fragmentary plan view of a corner of an outer ring blank constructed of a rectangular strip of sheet metal and showing one of a pair of symmetrical notches;

FIG. 6 is a reduced scale perspective illustration of a band formed from the blank illustrated in FIG. 5 with the ends of the blank welded together;

FIG. 7 is an enlarged scale transverse sectional view through a work piece comprising the band after a first stage of a cold forming operation whereby the band is shaped to form the outer ring;

FIG. 8 is a further sectional view through the work piece, similar to that of FIG. 7, yet showing a second stage configuration in the forming operation;

FIG. 9 is a fragmentary elevational view of the work piece in the configuration shown in FIG. 8; but of a modified embodiment;

FIG. 10 is a further transverse sectional view through the work piece, similar to that of FIGS. 7 and 8, yet showing a third stage of formation wherein an inturned bead has been formed on the minor diameter periphery of the work piece;

FIG. 11 is a fragmentary elevational view of the wheel trim ring similar to that of FIG. 9, but showing the completed ring;

FIG. 12 is an enlarged scale fragmentary sectional view through a portion of the ring, the same being taken substantially along the line 12—12 of FIG. 3 and showing the manner in which a peripheral bead of the outer ring engages a leg of the grip annulus which is registered with the weld.

DESCRIPTION OF THE PREFERRED EMBODIMENT

Figure 1:
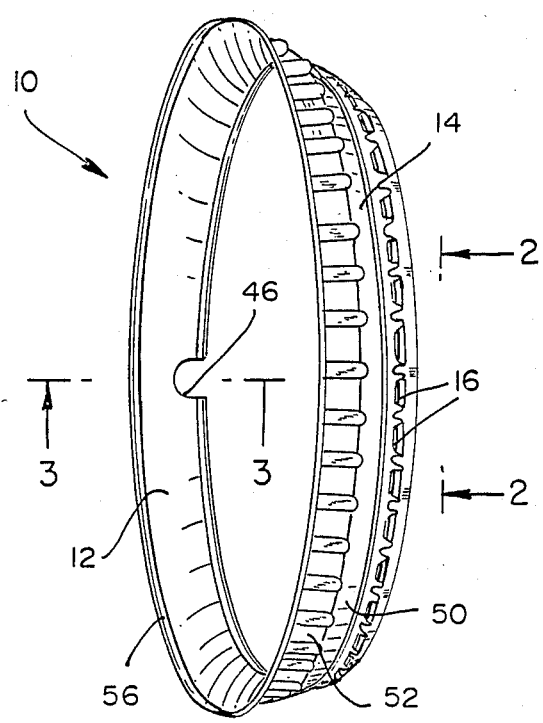
FIG. 1 is a perspective illustration of a wheel trim ring constructed in accordance with and embodying the invention and showing an outer decorative ring and an inner grip annulus which mounts the wheel trim ring to an automotive wheel rim.
Figure 2:
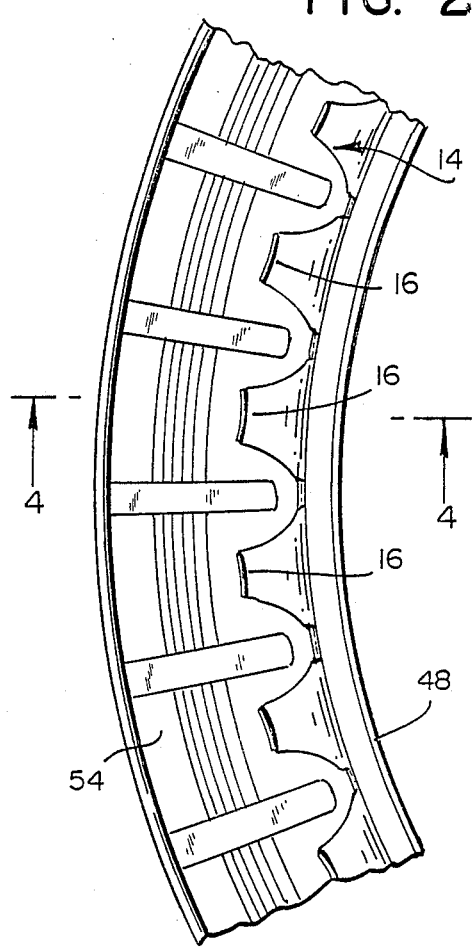
FIG. 2 is a fragmentary enlarged scale rear elevation view of the wheel trim ring, the same being taken along the plane 2—2 of FIG. 1. and illustrating a plurality of grip fingers on the annulus and several legs of the annulus which are secured to the outer ring beneath a crimped peripheral edge bead.

Referring now in detail to the drawings, the reference numeral 10 denotes generally a decorative wheel trim ring constructed in accordance with and embodying the invention. The trim ring 10 includes a decorative metal outer ring 12, preferably formed of stainless steel and an inner grip annulus 14, also preferably formed of stainless steel. The annulus 14 includes a plurality of radially projecting fingers 16 having downturned tips which include flukes 18 at their distal edges as shown in FIG. 11.

Figure 3:
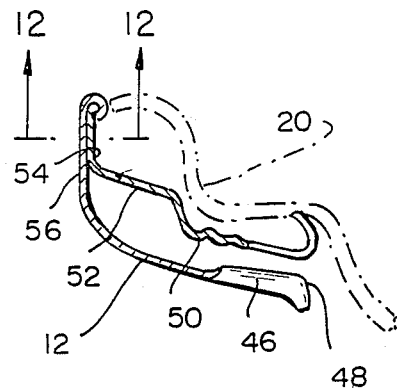
FIG. 3 is an enlarged scale sectional view through the wheel trim ring, the same being taken substantially along the plane 3—3 of FIG. 1 and through a valve stem cut out and showing, in phantom, a portion of the wheel rim.
Figure 4:
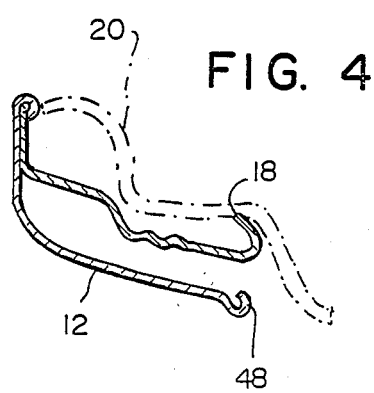
FIG. 4 is a further transverse sectional view through the wheel trim ring, similar to that of FIG. 3 but taken along the line 4—4 of FIG. 2.

The fingers 16 are biased in outward direction and are adapted to grip a vehicle wheel rim 20 (shown in phantom lines in FIGS. 3 and 4). Engagement between the fingers 16, and the wheel rim 20 serves to retain the wheel trim ring 10 securely mounted on the wheel rim 20.

The engagement between the grip annulus 14 and the wheel rim 20 is similar to that disclosed in U.S. Pat. No. 3,876,257 issued Apr. 8, 1975 to the assignee of the present invention and which is incorporated herein by reference. It should be appreciated that the grip mechanism disclosed in such reference utilized alternating long and short grip fingers. Although grip fingers of uniform length are illustrated herein, fingers of alternating lengths may also be utilized in the present invention. Further, equidistantly spaced individual grip fingers or clips rather than a complete annulus may be employed.

In accordance with the invention, the outer ring 12 is constructed from a sheet metal blank 22 shaped in a rectangular configuration. The blank 22 may be fed from a reel and is cut to a length approximating the circumference of the minimum diameter portion of the outer ring 12, for example, in the order of 36 inches for a 13 inch wheel rim application. The blank 22 has a width sufficient for spanning the portion of the wheel rim which is to be covered by the trim ring; preferably the sheet metal carried on the reel has been cut to the specified width.

A typical width is in the order of 3 inches and a desired thickness would be in the range of between 0.018 inches to 0.025 inches. Suitable metals include 30301 and 30304 stainless steel with a thickness in the order of 0.018 inches to 0.025 inches.

The blank 22 is trimmed to its desired length to provide a pair of straight ends 24 having surfaces which are perpendicular to an upper (as viewed in the FIG. 5 orientation) longitudinal edge 26 and a lower longitudinal edge 28.

Under the teachings of the present invention, a pair of wedge shaped strain relief notches 30 are cut in the longitudinal edge 26. The notches 30 are symmetrically disposed with respect to one another and are configured to provide their maximum depth adjacent each of the ends 24. Each of the notches 30 is positioned within a range of approximately 0.03 inches to 0.12 inches distant from each blank end 24 so as to provide a weld tab 32 between each notch 30 and each end 24. The tab 32 extends from the lowermost surface of the notch 30 to the upper edge 26.

Each notch 30 includes an upwardly inclined base surface 34 which extends from the maximum depth, adjacent to the end 24, to merge with the upper edge 26.

A typical slope angle of the base surface 34 is in the order of 8 degrees and a typical total length of the notch would be in the order of 0.94 inches at a notch depth of 0.06 inches. It has been found preferable to position each notch from the end 24, i.e. provide a tab width, which is the same dimension as the maximum depth of the notch. To assure alleviation of stresses at the notch 30, the base surface 34 is curved between its maximum depth and the upper edge 26 at the weld tab 32.

To fabricate the wheel trim ring 10, the ends 24 of the blank 22 are gathered, registered and butted together and maintained with a clamp to form a generally cylindrical loop. Thereafter, the ends are welded with a suitable welding apparatus such as a plasma-type welding system. The weld stroke commences at the weld tabs 32 and continues parallel to the cylindrical axis to the edge 28. A suitable welding apparatus and procedure is described in U.S. Pat. No. 4,068,362, incorporated herein by reference.

After completion of the weld operation, a transverse weld 36 is provided which permanently joins the ends 24 together without the need of clamps. Once welded, the blank 22 is transformed into a cylindrical band 38, illustrated in FIG. 6. It should be noted that the illustration of FIG. 6 is not to proportion, especially with reference to band thickness and notch dimensions.

The cylindrical band 38 is then positioned between male and female cold forming dies for a first stage of a cold-forming operation. The dies are pressed toward one another with the band 38 therebetween. A generally truncated funnel configuration work piece 40 is shaped from the band 38 during the first stage. The maximum diameter of the work piece 40 is at the edge 26 which includes the notches 30.

Thereafter, the first stage work piece 40 is positioned between a pair of second stage male and female dies and is cold formed into a second stage work piece 42, illustrated in FIG. 8. The second stage work piece is then placed between dies for a the next stage to produce a third stage work piece 44, illustrated in FIG. 10.

The work piece 44 may now be polished and chrome flashed to provide a high luster appearance. Optionally polishing and flashing may be deferred at this time to be the last manufacturing steps prior to packing. A valve stem cut out 46 is then punched in the work piece 44 in registry with the weld 36 and opening into the minor diameter circumference of the work piece 44. As a result of such positioning, the visible weld area of the wheel trim ring 10 is reduced. Thereafter a flange 48 is formed along the inner periphery of the work piece 44 by crimping.

The composite wheel trim ring is then formed by securing the grip annulus 14. The grip annulus is configured as illustrated in FIGS. 1 through 4. It may be formed of a strip of stainless steel which is banded together and secured by spot welding or rivets. The grip fingers 16 project from a central zone 50. Downwardly extending from the zone 50 are a plurality of legs 52 which are radially bent to provide generally flat outwardly projecting portions 54.

The grip annulus 14 is positioned on the outer ring 12 with the leg portions 54 juxtaposed against a generally flat radially outwardly extending zone 56 of the workpiece 44. The edge 26 of the outer ring 12 is then beaded and crimped over the tips of the leg portions 54 to secure the grip annulus 14 to the outer ring 12, as illustrated in FIG. 3 and 12.

By crimping the edge 26, the notches, the weld tabs and any weld burn through in the tabs will be concealed from view and will thus not detract from the appearance of the trim ring 10. It should also be noted that the length of the notches 30 are dimensioned not greater than the width of the leg portions 54 thus assuring positive crimping pressure against the leg in the area of the weld 36.

It should be appreciated that in accordance with the invention, the diameter of the edge surface 26 of the cylindrical blank 38 is expanded through successive cold forming stages, in the order of at least 25% of its original diameter. The particular configuration of the strain relief notches 30 has been empirically determined so as to permit such extensive deformation without stress cracking or tearing at or adjacent the weld 36. The utilization of alternate configuration strain relief notches has not permitted successful expansion to the same extent, nor has it been found that increasing the depth of the notch beyond the dimensions specified will result in greater deformation without failure. In fact, it has been found that the utilization of deeper notches resulted in stress failure with deformation in the 25% range.

The present invention should not be limited in interpretation to the particular trim ring configuration illustrated. For example, it's possible to cold form the band to alternate configurations and expand the band along both longitudinal edges. In such instances additional notches 30 will be desired for the edge 28.

Also, a band may be formed of more than one blank with the ends of adjacent blanks welded together. A pair of notches 30 would be provided adjacent each weld along the longitudinal edge which is to be expanded.

Further, in the alternate embodiment of FIG. 9, the weld 36 does not extend across the entire width of the band 38 but terminates before the edge 28, leaving an area of exposed abutting ends 24. Since the valve stem cut out 46 is registered with the weld 36, the unwelded area of the ends 24 (in the dashed line zone of FIG. 9) constitutes scrap. By not extending the weld through the scrap area, weld cycle time can be substantially reduced, resulting in an increase of production capacity.

Thus, it will be seen that there is provided a decorative wheel trim ring which meets the various aspects, features and considerations of the present invention and which is well suited for the conditions of practical use.

Since various embodiments may be made of the present invention and various changes may be made in the exemplary embodiment and method above set forth, it to be understood that all matter described herein and shown in the accompanying drawings is to be interpreted as illustrative and not in a limiting sense.

Having thus described the invention there is claimed as new and the desire to be secured by Letters Patent:

1. A blank suitable for fabrication into a composite metal wheel trim ring, the blank comprising a substantially rectangular strip of sheet metal, the strip having a pair of parallel opposite ends adapted for mating registration, the blank being adapted for integral welding along a weld seem registered with at least one of the ends, strain relief means for permitting cold forming expansion of the blank without fracture or tear at or adjacent the weld seam, the strain relief means comprising a pair of symmetrically disposed wedge shaped notches cut in at least one longitudinal edge of the blank adjacent each end, the one longitudinal edge being subject to cold forming expansion, each notch extending from the longitudinal edge to a maximum depth adjacent the end and tapering from the maximum depth toward the longitudinal edge.

2. A metal blank suitable for fabrication into a composite metal wheel trim ring as constructed in accordance with claim 1 wherein the maximum depth of each notch lies within a range of between 0.03 inches to 0.06 inches.

3. A blank suitable for fabrication into a composite metal wheel trim ring as constructed in accordance with claim 2 wherein the distance between each notch and its respective end is approximately the same as the maximum depth of the notch.

4. A blank suitable for fabrication into a composite metal wheel trim ring as constructed in accordance with claim 1 wherein the notch tapers from the maximum depth toward the longitudinal edge at an angle of 8 degrees with respect to the one longitudinal edge.

5. A blank suitable for fabrication into a composite metal wheel trim ring as constructed in accordance with claim 1 wherein the sheet metal comprises stainless steel having a thickness of from 0.018 inches to 0.025 inches.

6. A blank suitable for fabrication into a composite metal wheel trim ring as constructed in accordance with claim 1 wherein the weld seam extends along the two registered ends of the blank.

7. A welded metal band suitable for fabrication into a composite metal wheel trim ring, the band comprising a blank constructed in accordance with claim 1, the band including an integral weld extending from the one longitudinal edge toward an opposite longitudinal edge of the blank along the weld seam.

8. A welded metal band suitable for fabrication into a composite metal wheel trim ring as constructed in accordance with claim 7 wherein the sheet metal comprises stainless steel and the weld is a plasma weld.

9. A composite metal wheel trim ring, the ring comprising a metal ring having means for gripping a wheel rim, the metal ring including a cold formed metal band having a transverse weld, the band being expanded in the order of 25% of its original size from an initial diameter to an expanded diameter at a peripheral edge, the expanded diameter edge including strain relief means for permitting such expansion by cold forming without stress failure at or adjacent the weld, the strain relief means comprising wedge shaped notches symmetrically positioned on the expanded diameter edge adjacent and on opposite sides of the weld.

10. A composite metal wheel trim ring constructed in accordance with claim 9 further including means for securing the means for gripping to the metal ring, the securing means including means forming a crimped peripheral bead on the maximum diameter edge, the grip annulus being engaged by the peripheral bead.

11. A composite metal wheel trim ring constructed in accordance with claim 9 wherein each notch extends from the expanded diameter edge toward a maximum depth, the maximum depth being adjacent the weld.

12. A composite metal wheel trim ring constructed in accordance with claim 9 wherein the ring comprises stainless steel having a thickness from 0.018 inches to 0.025 inches.

* * * * *